United States Patent
Wood et al.

(10) Patent No.: US 11,348,475 B2
(45) Date of Patent: May 31, 2022

(54) SYSTEM AND METHOD FOR INTERACTIVE COGNITIVE TASK ASSISTANCE

(71) Applicant: The Boeing Company, Chicago, IL (US)

(72) Inventors: William J. Wood, Huntington Beach, CA (US); Mark H. Boyd, Long Beach, CA (US); Melanie K. Lorang, Huntington Beach, CA (US); David H. Kusuda, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/649,382

(22) Filed: Jul. 13, 2017

(65) Prior Publication Data
US 2018/0165978 A1 Jun. 14, 2018

Related U.S. Application Data

(60) Provisional application No. 62/432,495, filed on Dec. 9, 2016.

(51) Int. Cl.
*G10L 21/00* (2013.01)
*G10L 25/00* (2013.01)
(Continued)

(52) U.S. Cl.
CPC .......... *G09B 5/02* (2013.01); *G05B 19/0423* (2013.01); *G06T 19/006* (2013.01); *G09B 19/24* (2013.01);
(Continued)

(58) Field of Classification Search
CPC .......... G06F 3/167; G06F 3/017; G06F 3/011; G06F 3/0482; G06F 3/04883;
(Continued)

(56) References Cited

U.S. PATENT DOCUMENTS 6,978,846 B2 12/2005 Kawai et al.
7,620,894 B1 * 11/2009 Kahn .................... G06F 3/0481
715/707

(Continued)

FOREIGN PATENT DOCUMENTS

JP 2003-517158 A 5/2003
JP 2003-524814 A 8/2003
(Continued)

OTHER PUBLICATIONS

S. Henderson and S. Feiner, "Exploring the Benefits of Augmented Reality Documentation for Maintenance and Repair," in IEEE Transactions on Visualization and Computer Graphics, vol. 17, No. 10, pp. 1355-1368, Oct. 2011.doi: 10.1109/TVCG.2010.245 (Year: 2011).*

(Continued)

*Primary Examiner* — Michael Ortiz-Sanchez
(74) *Attorney, Agent, or Firm* — Alston & Bird LLP

(57) ABSTRACT

A cognitive assistant that allows a maintainer to speak to an application using natural language is disclosed. The maintainer can quickly interact with an application hands-free without the need to use complex user interfaces or memorized voice commands. The assistant provides instructions to the maintainer using augmented reality audio and visual cues. The assistant will walk the maintainer through maintenance tasks and verify proper execution using IoT sensors. If after completing a step, the IoT sensors are not as expected, the maintainer is notified on how to resolve the situation.

48 Claims, 9 Drawing Sheets

(51) Int. Cl.
| | |
|---|---|
| G09B 5/02 | (2006.01) |
| G05B 19/042 | (2006.01) |
| G06T 19/00 | (2011.01) |
| G09B 19/24 | (2006.01) |
| G10L 15/22 | (2006.01) |
| G06F 16/242 | (2019.01) |
| H04L 67/12 | (2022.01) |

(52) U.S. Cl.
CPC .... *G10L 15/22* (2013.01); *G05B 2219/24019* (2013.01); *G05B 2219/32014* (2013.01); *G05B 2219/32226* (2013.01); *G06F 16/243* (2019.01); *G10L 2015/223* (2013.01); *H04L 67/12* (2013.01); *Y02P 90/02* (2015.11)

(58) Field of Classification Search
CPC .......... G06F 1/163; G06F 3/016; G06F 9/453; G06F 3/0659; G06F 17/2785; G06F 21/84; G06F 2203/0381; G06F 3/014; G06F 11/00; G06F 16/00; G06F 16/3329; G06F 16/3344; G06F 16/738; G06F 16/9535; G06F 19/00; G06F 3/048; G06F 3/1204; G06F 8/34; G06F 3/1208; G06F 3/1256; G06F 9/44; G06F 9/4843; G10L 15/22; G10L 2015/223; G10L 15/265; G10L 21/06; G10L 15/30; G10L 2015/225; G10L 2015/221; G10L 15/24; G10L 2021/0575; G10L 25/78; G10L 15/00; G10L 25/00; G10L 13/00; B25J 9/0003; B25J 11/0005; B25J 19/026; H04M 2201/40; H04M 1/72522; H04M 1/72533; H04M 2203/355; B64C 13/10; B64C 13/18; B64C 1/066; B64D 11/0689; B64F 5/60; H04N 5/772; H04N 1/00411; H04N 1/00477; H04N 21/42203; H04N 21/42204; H04N 21/23418; H04N 21/42201; H04N 21/4415; H04N 21/44218; H04N 21/4532; H04N 21/6543; H04L 51/02; H04L 41/22; H04L 51/16; G06Q 10/063112; A61H 31/005; A61H 2201/5048; A61H 2201/5058; A61H 2201/5071; A61H 2201/5079; A61H 2201/5084; A61H 2201/5092; A63B 2071/063; G06K 9/00771; G09B 5/06; G09B 5/00; G09B 7/00; G09B 9/00; G09B 1/00; G09B 3/00; G09B 5/04; Y02P 90/02; G06T 19/006
See application file for complete search history.

(56) References Cited

U.S. PATENT DOCUMENTS

| | | | | |
|---|---|---|---|---|
| 9,406,170 | B1* | 8/2016 | Grampurohit | G06T 3/005 |
| 10,022,614 | B1* | 7/2018 | Tran | A63B 71/145 |
| 10,127,227 | B1* | 11/2018 | Badr | G06F 9/468 |
| 2002/0069072 | A1 | 6/2002 | Friedrich et al. | |
| 2006/0078183 | A1* | 4/2006 | deCharms | A61B 5/055 |
| | | | | 382/128 |
| 2012/0069131 | A1* | 3/2012 | Abelow | G06Q 10/067 |
| | | | | 348/14.01 |
| 2012/0308972 | A1* | 12/2012 | Miller | G06F 3/048 |
| | | | | 434/236 |
| 2013/0010068 | A1* | 1/2013 | Tiernan | G06K 9/228 |
| | | | | 348/46 |
| 2013/0274904 | A1* | 10/2013 | Coza | A63B 71/0619 |
| | | | | 700/91 |
| 2013/0325155 | A1* | 12/2013 | Ryznar | G05B 19/41805 |
| | | | | 700/95 |
| 2014/0176603 | A1 | 6/2014 | Kumar et al. | |
| 2015/0088547 | A1* | 3/2015 | Balram | G16H 40/67 |
| | | | | 705/3 |
| 2015/0243013 | A1* | 8/2015 | White | G09B 5/06 |
| | | | | 382/103 |
| 2016/0125342 | A1* | 5/2016 | Miller | G06Q 10/06 |
| | | | | 705/7.26 |
| 2016/0307459 | A1* | 10/2016 | Chestnut | G06F 3/14 |
| 2018/0004481 | A1* | 1/2018 | Fallon | G06F 3/012 |
| 2018/0113674 | A1* | 4/2018 | Jin | G06F 3/167 |
| 2018/0133583 | A1* | 5/2018 | Tran | A63B 69/38 |
| 2018/0251230 | A1* | 9/2018 | Chavez | A42B 3/0433 |
| 2018/0300952 | A1* | 10/2018 | Evans | G06T 19/006 |
| 2018/0336010 | A1* | 11/2018 | Mukherjee | H04W 76/14 |
| 2018/0336893 | A1* | 11/2018 | Robinson | G10L 15/22 |

FOREIGN PATENT DOCUMENTS

| | | |
|---|---|---|
| JP | 2005-066787 A | 3/2005 |
| JP | 2011-131331 A | 7/2011 |
| JP | 2013031900 A | 2/2013 |
| JP | 2013-166211 A | 8/2013 |
| KR | 10-2016-0125428 A | 10/2016 |
| RU | 2013147677 A | 8/2018 |
| WO | WO 01/35391 A1 | 5/2001 |
| WO | 2012109593 | 8/2012 |
| WO | 2012142250 | 10/2012 |
| WO | WO 2015/130718 A1 | 9/2015 |

OTHER PUBLICATIONS

T. Haritos and N. D. Macchiarella, "A mobile application of augmented reality for aerospace maintenance training," 24th Digital Avionics Systems Conference, Washington, DC, 2005, pp. 5.B.3-5.1.doi: 10.1109/DASC.2005.1563376 (Year: 2005).*

S. J. Henderson and S. Feiner, "Evaluating the benefits of augmented reality for task localization in maintenance of an armored personnel carrier turret," 2009 8th IEEE International Symposium on Mixed and Augmented Reality(ISMAR), Orlando, FL, USA, 2009, pp. 135-144.doi:10.1109/ISMAR.2009.5336486 (Year: 2009.*

S. Henderson and S. Feiner, "Augmented Reality for Maintenance and Repair (ARMAR), Columbia University Department of Computer Science", "Air Force Research Laboratory", Aug. 2007 (Year: 2007).*

Gallagher AG, Ritter EM, Champion H, et al. Virtual reality simulation for the operating room: proficiency-based training as a paradigm shift in surgical skills training. Ann Surg. 2005;241(2):364-372. doi: 10.1097/01.sla.0000151982.85062.80 (Year: 2005).*

"Augmented Reality from BMW", YouTube, Published Dec. 7, 2009. https://www.youtube.com/watch?v=momFRUE1YiY.

Henderson, S., et al., "Augmented Reality for Maintenance and Repair (ARMAR)", Columbia University Graphics and User Interfaces Lab, Columbia Univerisity, May 24, 2017. http://graphics.cs.columbia.edu/kenny/project/armar/.

Woollaston, V., "End of the mechanic? BMW smart glasses make it possible for ANYONE to spot and fix a car engine fault just by looking at it", DailyMail.com, Jan. 21, 2014. http://www.dailymail.co.uk/sciencetech/article-2543395/The-end-mechanic-Smart-glasses-make-possible-fix-car-engine-just-looking-it.html.

"Daqri Smart Helmet", WIRED, May 24, 2017. https://www.wired.com/2016/01/daqri-helmet/.

"Inscape Augmented Reality: Built with industrial requirements in mind, Inscape AR revolutionizes the creation of cost-effective support applications", Inscape, retrieved Oct. 26, 2017. http://www.inscape3d.com/products/augmentedreality.

European Examination Report dated Sep. 23, 2019 for European Patent Application No. 17195963.8.

European Examination Report dated Jan. 31, 2020 for European Patent Appln No. 17195963.8.

Office Action dated Jan. 19, 2021 for Canadian Patent Application No. 2,982,575.

(56) References Cited

OTHER PUBLICATIONS

Notification on the Results of the Patentability Examination of an Invention for Russian Patent Application No. 2017136560/28(063733), dated Feb. 10, 2021, (12 pages), Federal Institute of Industrial Property, Moscow, Russia.
Korean Notice of Office Action dated Nov. 30, 2021 for Korean Patent Application No. 10-2017-0148501.
European Examination Report dated Jun. 12, 2020 for European Patent Appln No. 17195963.8.
Canadian Office Action dated Novembers, 2021 for Canadian Patent Application No. 2,982,575.
Russian Office Action dated Aug. 25, 2021 for Russian Patent Application No. 2017136560/28(063733).
Japanese Notice of Reasons for Rejection dated Aug. 10, 2021 for Japanese Patent Application No. 2017-234756.
European Examination Report dated Dec. 10, 2018 for European Patent Application No. 17 195 963.8.
European Examination Report dated Apr. 18, 2019 for European Patent Application No. 17195963.8.
Japanese Notice of Reasons for Rejection dated Mar. 29, 2022, for Japanese Patent Application No. 2017-234756.

* cited by examiner

SYSTEM AND METHOD FOR INTERACTIVE COGNITIVE TASK ASSISTANCE

CROSS-REFERENCE TO RELATED APPLICATIONS

This application claims benefit of U.S. Provisional Patent Application No. 62/432,495, entitled "DEFENSE INTERNET OF THINGS (DIoT)," by William'. Wood, filed Dec. 9, 2016, which application is hereby incorporated by reference herein.

BACKGROUND

1. Field

The present disclosure relates to systems and methods for producing and maintaining physical structures, and in particular to a system and method for providing users guidance to perform tasks on physical structures.

2. Description of the Related Art

Traditional maintenance activity uses paper maintenance manuals that the user (maintainer) references in order to look up the proper maintenance tasks and to follow each step of those tasks. As a consequence, the maintainer must locate the paper maintenance manual, find the appropriate portion of the manual related to the desired maintenance task, determine which tools and other resources are required (often located elsewhere) and obtain those tools and resources. The maintainer must then reference the paper maintenance manual for each step, perform the step, then re-reference the paper maintenance manual to determine the next step. That the maintainer must constantly stop work to reference the manual instructions for each step extends the time require to perform the task and increases the chances of errors on the part of the maintainer. In sum, paper maintenance manuals must be stored and retrieved, and cannot easily be searched and queried, and requires the maintainer to move between the maintenance task and the associated manual, slowing down the maintenance process.

Although digital maintenance manuals exist and alleviate some of these drawbacks by making the manual portable and searchable, the maintainer must still have free hands to interact with the digital maintenance manual. A digital maintenance manual may include a video, but such videos typically run either faster or slower than the maintainer's ability to perform the steps, hence the maintainer must constantly start and restart (or rewind) the playback of the video.

Systems are available that improve upon such digital maintenance manuals. For example, augmented reality has been used to guide maintainers through maintenance steps, using augmented reality glasses. One such system has been proposed by Bavarian Motor Works, as described in "End of the Mechanic? BMW Smart Glasses Make it Possible for Anyone to Spot and Fix a Car Engine Fault Just by Looking at It," by Victoria Woollaston, Daily Mail, published Jan. 21, 2014, which is hereby incorporated by reference herein. An example of a similar system is described in "Augmented Reality for Maintenance and Repair (ARMAR)," by Steve Henderson and Steven Feiner, Columbia University Computer Graphics and User Interfaces Lab, 2016, also incorporated by reference herein. This discloses the use of real time computer graphics, overlaid on and registered with the actual repaired equipment to improve the productivity, accuracy, and safety of maintenance personnel by use of head-worn, motion-tracked displays augment the user's physical view of the system with information such as sub-component labeling, guided maintenance steps, real time diagnostic data, and safety warnings. Such systems may use smart helmets such as those available from DAQRI, described in "Daqri Smart Helmet," by Brian Barrett, Wired, Jan. 7, 2016, also incorporated by reference herein.

Unfortunately, such existing systems do not resolve many maintenance issues. For example, user interaction with the BMW system involves a voice interaction limited to the maintainer providing verbal commands such as "next step." The system does not determine the task to be performed nor the steps of that task using ordinary language requests from the user. Consequently, for a given problem, the maintainer must still determine which task to perform (e.g. there is no diagnosis nor any feature that allows the user to a goal to be achieved in ordinary language to find the proper task or task steps. The ARMAR and DAQRI systems are similarly deficient in this respect.

The foregoing systems also fail to monitor the performance of the steps (to provide feedback confirming that the step has been properly performed or indicating that it has not, with corrective action provided) or to provide data logging the performance of the step. For example, the step to be performed may be to tighten a nut to a bolt to a particular torque.

With respect to monitoring the performance of the steps to provide feedback, none of the foregoing systems sense whether maintainer has failed to tighten the nut to the proper specification, whether the maintainer is using the proper tool, whether the user has failed to align the nut on the threads of the bolt before tightening it. Such errors are unlikely to be timely discovered, and if discovered, would waste time, as they may require disassembly or performing the task steps in reverse order to allow the error to be corrected. Also, none of the foregoing systems can sense whether the step is being performed properly while the user is performing the step, and thus prevent damage to either the tools used, or the structure being worked on.

With respect to logging, none of the foregoing systems record any data regarding performance of the step. Such data can be used to further refine maintenance procedures, or estimate of how long such procedures should take. The data may also be used to identify causes of subsequent failures (e.g. subsequent failures were more common when a nut from a particular vendor was torqued to the upper end of a torque specification).

Therefore, it would be desirable to have a method and apparatus that take into account at least some of the issues discussed above, as well as other possible issues.

SUMMARY

To address the requirements described above, this document discloses a system and method for providing guidance to perform a task having at least one step performed on a physical structure at a station. In one embodiment, the method comprises receiving, in a guidance processing unit, a command from a performance entity, the command invoking the task, determining, in the guidance processing unit, the at least one step from the command, transmitting, from the guidance processing unit to the performance entity, instruction data illustrating performance of the at least one step, receiving, in the guidance processing unit, real time sensor data generated by a sensor proximate the physical structure sensing performance of the step, and computing a performance measure of the step according to the sensor data.

Another embodiment is evidenced by a system for providing guidance to perform a task having at least one step performed on a physical structure at a station, in which the system comprises a sensor proximate the physical structure, a presentation device, and a guidance processing unit comprising a processor communicatively coupled to a memory storing instructions comprising instructions. The instructions include instructions for receiving a command from a performance entity, the command invoking the task, determining the at least one step from the command, transmitting, instruction data illustrating performance of the at least one step to the performance entity for presentation by the presentation device, receiving real time sensor data generated by the sensor proximate the physical structure sensing performance of the step, and computing a performance measure of the step according to the sensor data.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
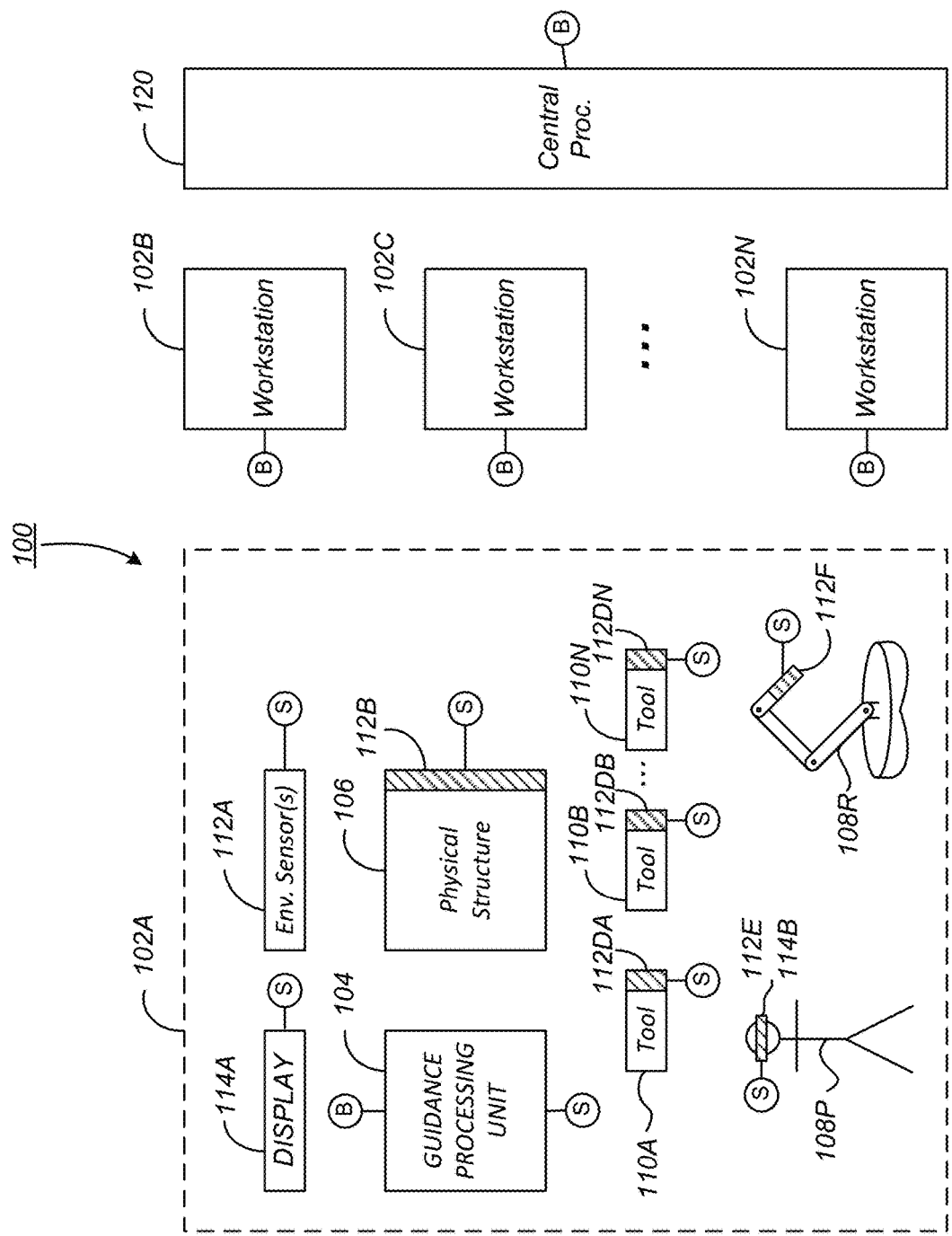
FIG. 1 is a diagram depicting an exemplary maintenance/assembly/test facility.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The system and method described herein improves the performance and efficiency of a maintainer of a platform or other physical structure by assisting the maintainer in locating correct maintenance procedures, guiding the maintainer through each maintenance step using audio and visual queues, and validating the correctness of each step through the use of sensor feedback. In one embodiment, the sensors are integrated via the Internet of Things (IoT). The system provides the capability to (1) use visual and other IoT sensors to perform initial diagnostics to select the appropriate work order for the maintainer (2) automatically collect images and data associated with maintenance operations to provide a sensor validated audit trail rather than relying on maintainer manual input (3) automatically collect performance and cycle time metrics showing how long maintenance steps take to perform to identify process improvement opportunities, including maintainer training opportunities. In one embodiment, the system operates under voice control using natural language to issue commands and to control the maintenance environment. For example, the operator can audibly request that a light be turned on, rather than reaching for a light switch.

The system and method adds several cognitive capabilities to a new maintenance tool including speech-to-text, text-to-speech, natural language processing, machine learning and augmented reality. These capabilities allow the maintainer to interact with the maintenance tool using natural spoken commands without the need to memorize exact voice commands. The tool also leverages natural language processing and machine learning to determine the intent of voice commands and react accordingly to such commands. Feedback from the tool is presented to the maintainer using hands-free augmented reality providing natural language audio commands and 3D visual information overlaid onto real-world objects.

The tool aggregates of several distinct capabilities to make an end system more powerful than each individual component. In one embodiment, the tool combines IoT, Cognitive Natural Language Processing, and advanced document indexing and querying. This allows the maintainer to easily access all knowledge required to perform maintenance quickly and effectively. The tool also makes the maintenance operations completely hands-free by conveying information as a combination of audio and 3D visual cues through an augmented reality environment. The tool also adds cognitive capabilities and IoT feedback to existing maintenance tools that otherwise requires mostly manual and unverified maintenance steps. The addition of the cognitive capabilities allows the maintainer to locate relevant maintenance information in a fast and efficient manner, and adding IoT feedback verifies the proper completion of each step reducing rework.

Although described primarily in terms of performing maintenance tasks, the tool is equally at home in production applications, or anywhere where tasks are performed on physical structures, including manufacturing and quality control. For example, the techniques described below are applicable to the assembly and testing of physical structures including automobiles, aircraft, spacecraft and water vessels.

FIG. 1 is a diagram depicting an exemplary maintenance/assembly/test (MAT) facility 100 (hereinafter simply referred to as a facility or MAT 100. The MAT 100 has one or more stations 102A-102N (hereinafter alternatively referred to as stations 102) at which tasks are performed. Each station 102 includes a physical structure 106 upon which maintenance is performed, parts are assembled/disassembled, or tests are being performed). The stations 102 may also comprise one or more tools 110A-110N (alternatively referred to hereinafter as tool(s) 110) that are used to perform the tasks on the physical structure 106. Such tasks can be performed by one or more users such as person(s) 108P or robot(s) 108R (hereinafter alternatively referred to as user(s) 108).

One or more of the physical structure 106, tools 110 and user 108 include one or more sensors (collectively referred to as sensors 112) which measure or monitor a characteristic of the associated physical structure 106, tools 110, or user 108, respectively. For example, the physical structure 106 may include one or more physical structure sensors 112B which sense a characteristic of the physical structure 106. This characteristic may include a physical characteristic, such as the position or angle of an appendage relative to another portion of the physical structure 106, an electrical characteristic, such as a voltage or current measurement on a conductor or the physical structure 106, or any other quality measurable by a sensor of any type. The physical structure sensors 112B may include sensors that are part of the completed assembly of the physical structure 106, or physical structure sensors 112B that are affixed to the physical structure 106 for maintenance or production purposes and later removed before assembly or maintenance is completed. For example, the physical structure 106 may comprise a flight control surface such a rudder that includes an integral potentiometer that measures the position of the rudder for purposes of navigation and control. In this example, this potentiometer may be used as one of the physical structure sensors 112B of the physical structure 106 not only for the operational assembly, but for testing purposes as well. In other embodiments, another physical structure sensors 112B may be attached to the physical structure for performing the MAT operation. For example, a separate potentiometer may be affixed to the rudder, and rudder position measurements with this sensor may be compared to the measured position of the rudder by the integral potentiometer.

Similarly, one or more of the tools 110 each may include one or more sensors 112DA-112DN that are used to sense or measure a characteristic of the associated tool 110A-110N, respectively. That characteristic may likewise include one or more of a physical characteristic, electrical characteristic or any other quality measured by the sensors 112. For example, tool 110A may comprise a torque wrench and the sensor 112DA may measure the torque being imparted upon a portion of the physical structure 106 such as a bolt or nut by the torque wrench. Such sensors 112D may also include temperature sensors (to monitor the temperature of the tool 110 during use).

Likewise, one or more of the users 108 may comprise or use one or more sensors 112. The user(s) 108 may comprise a person 108P or a robot 108R, for example. The robot 108R may include one or more robot sensors 112F to sense a characteristic of the robot 108R one or more characteristics of the other elements of the station 102A (including the physical structure 106 tools 110, or person 108P). In one embodiment, the robot 108R includes a plurality of potentiometers, which provide an indication of the relative position of the structures of the robot 108R, and from which the position of the head or working surface of the robot 108R may be determined. This can be used, for example, to determine the position of the working end of the robot 108 as well as any of its structures as a function of time. In another embodiment, the robot 108R includes a camera or other visual sensor dispose at or near the working end, so that visual representations of the region surrounding the working end may be obtained. Sensors 112F may be integrated with the robot 108R (e.g. with sensor measurements being used by the robot 108R to control robot responses to commands) or may be added to the robot 108R only for use at the station 102 to perform MAT operations. Such robot sensors 112F may also include temperature sensors (to monitor the temperature of the robot 108R or portions of the robot 108R during use).

As another example, the person 108P may wear one or more sensors 112E. Such sensors 112E may include, for example, an augmented reality headset. Such headsets typically comprise a stereoscopic head-mounted display (providing separate images for each of the person's eyes), and head motion tracking sensors. Such motion tracking sensors may include, for example, inertial sensors such as accelerometers and gyroscopes, structured light systems, and eye-tracking sensors. When the augmented reality headset is worn by the person 108P, the person can view their surroundings, but stereoscopic images are imposed upon those surroundings. Such stereoscopic images can include, for example, portions of the physical structure 106 or the changes to the physical structure 106 called for by steps of the task. The inertial sensors and eye sensors can be used to determine the direction the user is looking in inertial space, and images of the physical structure superimposed on those images.

Because the augmented reality headsets not only record video images, but also present video images superimposed on real images, such headsets can be regarded not only as sensors, but also presentation elements of the augmented reality headset 114B which present information to the user 108. The station 102A may also include a more conventional presentation device such as a display 114A, for displaying instruction information.

The sensors 112E may also include other sensors 112E such as appendage mounted inertial sensors such as accelerometers or gyros, which can measure the inertial state of the person's appendages. In some embodiments, the sensors may include sensors to monitor the person 108P, such as sensors that measure temperature or heart rate. The information provided by such sensors are useful in determining if the tasks being performed by the person 108P are particularly difficult.

The station 102A may also include environmental sensors 112A. Environmental sensors 112A are sensors that measure characteristic of the environment of the station 102. This may include, for example, the sensors that measure ambient temperature or humidity (e.g. using a thermometer and hygrometer), visible sensors that determine the physical location or proximity of any of the elements of the station 102 to each other including elements of the physical structure 106, the tools 110, the user 108 or guidance processing unit 104. Environmental sensors 112A may include elements that are disposed on other elements of the station 102A. The environmental sensors 112A may comprise passive, active, or semi-active systems. For example, one embodiment of an active environmental sensor may comprise a reflector positioned on another element of the station 102 (e.g. an arm of the robot 108R), an illuminator that illuminates the reflector, and a visual sensor that measures the position of the illuminated sensor. An example of a passive environmental sensor is a visual sensor such as a video or still camera, which may be sensitive to visible, ultraviolet, or infrared wavelengths. Environmental sensors 112A may also include radio frequency identification (RFID) systems, which can be used to identify the physical structure 106 and its characteristics.

Any or all of the sensors 112 are communicatively coupled to a guidance processing unit 104 (indicated by the Ⓢ symbols), permitting the guidance processing unit 104 to receive the data from the sensors. Further, the guidance processing unit 104 may be communicatively coupled to the guidance processing units of other stations 102B-102N and to a central processor 120 (as indicated by the Ⓑ symbols).

Figure 2:
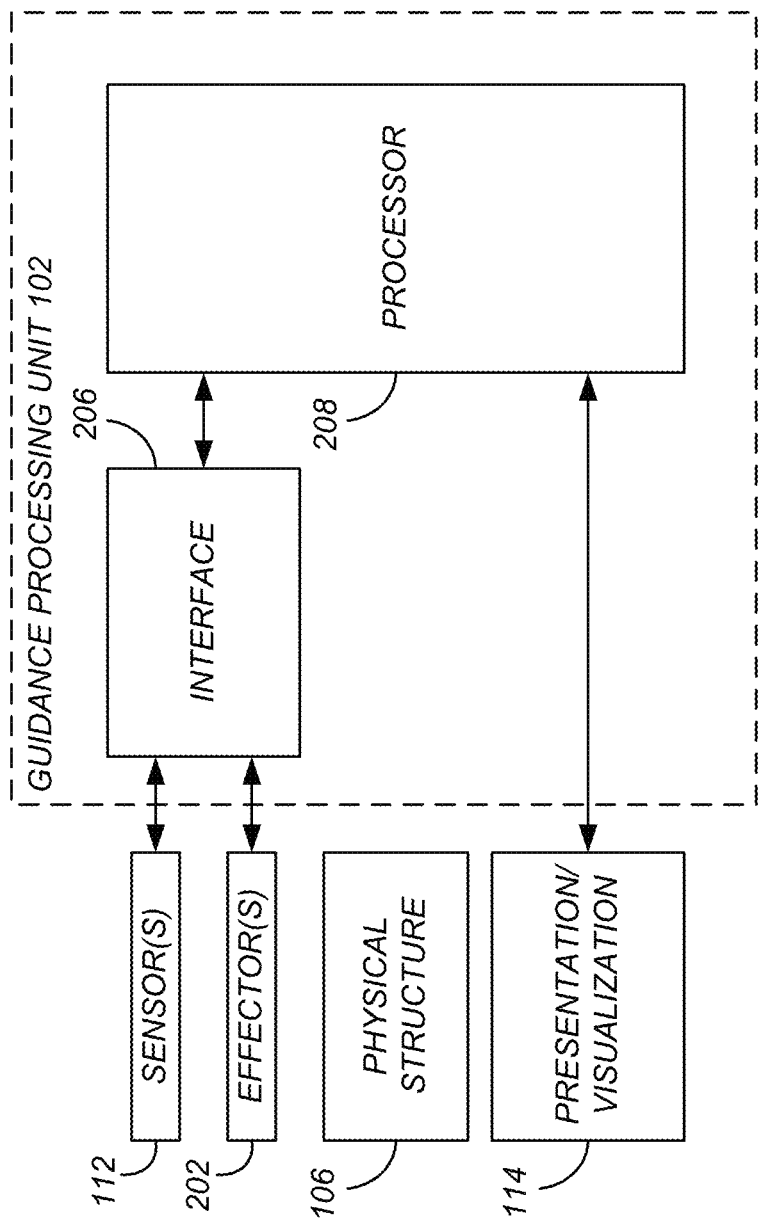
FIG. 2 presents a functional block diagram of one embodiment of a station.

FIG. 2 is a diagram of one embodiment of the station 102. The station 102 includes the guidance processing unit 104, one or more sensors 112, effectors 202, presentation devices 114 (which include the display 114A and presentation elements of the augmented reality headset 114B), and the physical structure 106.

The guidance processing unit 104 receives sensor data from the sensors 112 and in some embodiments, provides sensor commands to the sensors 112 as well. Such commands may include, for example, commands regarding the resolution or active range of the sensors 112. The guidance processing unit 104 also sends commands and receives data from effectors. Such effectors might include, for example, a stepper motor that controls one of the sensors 112 or the robot 108R.

In the illustrated embodiment, the guidance processing unit 104 includes an interface 206 communicatively coupled to a processor 208. Sensors 112 provide sensor data to the processor 208 via interface 206. Further, sensors 112 may receive commands from the processor via interface 206. Similarly, the processor 208, through the interface 206, provides commands to effectors 202 and may received data from effectors 202 as well.

The guidance processing unit 104 provides instruction data illustrating performance of the steps performed on the physical structure to complete tasks to the presentation devices 114, and may also provide commands to control the sensors 112 via the interface 206. Likewise, presentation devices 114 may provide commands or information to the guidance processing unit 104.

The guidance processing unit 104 comprises a processor 208 is communicatively coupled to one or more memories storing processor instructions, which when executed, cause the guidance processing unit 104 to perform the operations described below. The processor 208 may include multiple processors 208 and such processors 208 may be located remotely from one another. In an embodiment described further below, processor 208 comprises distributed processing elements.

Figure 3A:
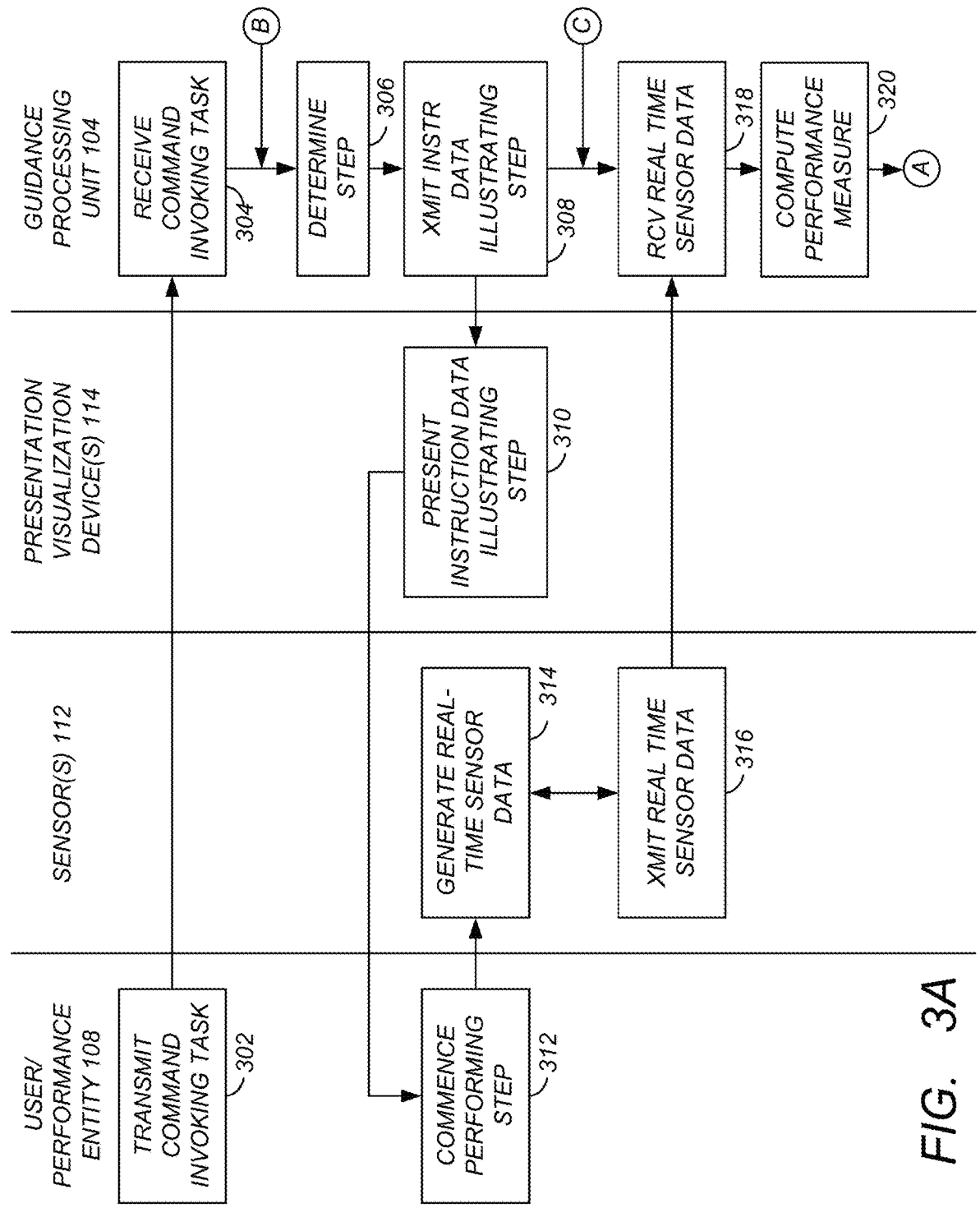
FIGS. 3A-3C are diagrams depicting one embodiment of exemplary process steps that an be used to guide users in the completion of tasks.
Figure 3B:
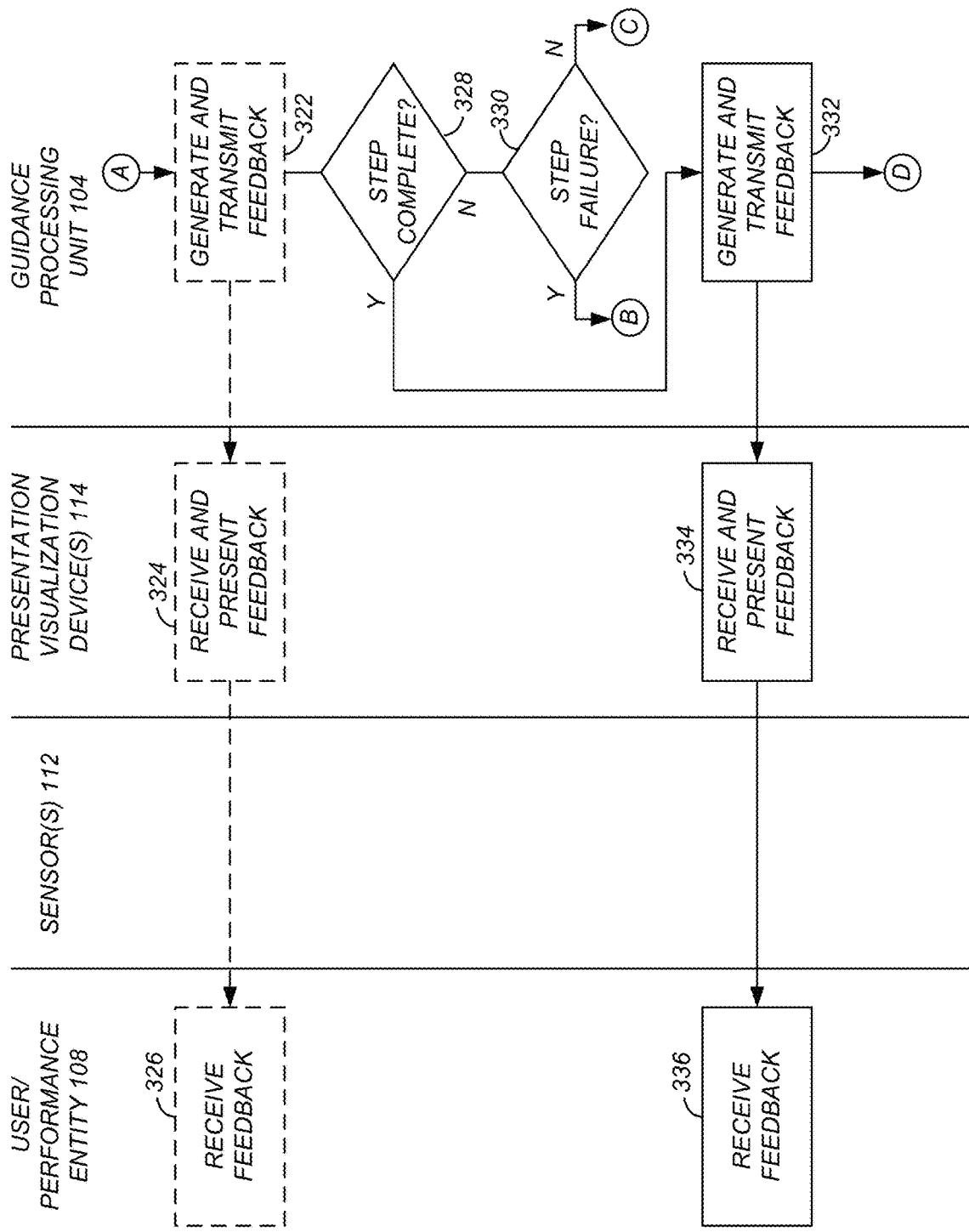

FIGS. 3A-3B are diagrams depicting one embodiment of exemplary process steps that can be used to guide the user 108 in the completion of tasks involving one or more steps on physical structures 106. In block 302, the user 108 or performance entity transmits a command invoking a task to be performed on the physical structure 106. In block 304, the command is received by the guidance processing unit 104.

In one embodiment, this command is a hands-free (e.g. voice) command that is sensed by an audio sensor and provided to the guidance processing unit 104, where the audio command is recognized by a speech recognition module and translated into text. Such voice commands may be in a fixed command language (where the onus is on the user 108 to learn the command syntax and phrasing required by the guidance processing unit 104) and natural language (where the onus is on the guidance processing unit 104 to interpret the voice commands and translate them into a syntax and phrasing needed to search for the appropriate task and steps. Fixed command languages can include domain-specific training accomplished by training software components that translate the user's speech to text.

In other embodiments, the command comprises a digital command via a controller device communicatively coupled to the guidance processing unit 104, such as a remote control, computer keyboard, mouse, game controller, or touch screen display. In another embodiment, the command is sensed by a monitoring system, and translated into a digital command. For example, the command may be wholly or partially implemented using gestures performed by the user 108, sensed by an imaging sensor (for example, the environment sensor 112A) and provided to the guidance processing unit, where such gestures are analyzed, interpreted, and translated into digital commands.

In still other embodiments, the command is a digital command received via a system-to-system message from control system for the robot 108R or other robots at other stations 102 or the central processor 120.

Next, the guidance processing unit 104 determines one or more steps to be performed from the received command. The received commands may be in many different forms. In one embodiment, the command comprises a generalized goal rather than a specific task. For example, the user 108 may issue a command "air conditioning is not functional." Given this command, the guidance processing unit 104 determines what problems with the physical structure may be the cause of non-functional air conditioning. In making this determination, the guidance processing unit 104 may accept input from an on-board diagnostic (OBD)-type sensor. The guidance processing unit 104 then determines one or more tasks responsive to the command, and determines at least one step from the determined task. For example, in the case of the failed air conditioning example, the guidance processing unit may generate a plurality of tasks, each for checking each component of the air conditioning system as well as a task for diagnosing which of the components is defective. Each task may have one or more subtasks hierarchically below each task. At the bottom of the hierarchy of tasks and subtasks are the steps, which represent a unit of activity suitable for specific instructions to the user 108. In the foregoing example, the step may be to remove a single screw of the air conditioning compressor, or to remove a subsystem of the air conditioning compressor. The hierarchical level at which steps are defined may depend on the complexity of the step and the experience of the user 108. For example, the voice command may include an indication of how experienced the user 108 is, and the hierarchical level of steps defined according to this level of experience. As defined further herein, the guidance processing unit 104 may store performance data indicating how well the user 108 has performed steps or tasks, and this information can be used to determine the level of experience of the user 108, resulting in steps or instructions suitable for the user's level of experience. In this case, the user 108 may be determined by user input (e.g. typing or speaking the user's name), via RFID technologies, or other means.

In one embodiment, determining the task from the received command comprises generating a database query from the received command using a natural language interpreter. Such interpreters allow users to issue commands in plain conversational language. The words in the command are parsed, and the parsed words are analyzed for syntax, semantics, discourse and speech. The result is a database query in the appropriate language and syntax. This query is provided to a database communicatively coupled to the guidance processing unit (e.g. the central processor 120), and the task is determined from the result of the database query. Once the task is identified, a query may be generated based on the task to retrieve the appropriate steps to perform, subject to the user's experience and abilities.

In one embodiment, the task is one of a plurality of tasks to be performed on the physical structure 106, and the database query is further determined according to current context data. Such context data comprises, for example, information about other of the plurality of tasks performed on the physical structure 106 and constraints on the task imposed by the physical structure itself, the environment (e.g. the position of other elements or physical structures, temperature, humidity, performance limitations of the tools 110). For example, a task may have been performed on the physical structure 106 that changes the steps needed to perform another particular task. Returning to the example of the air conditioning system, another task may have resulted in the removal of a subsystem or part, making the removal of that subsystem or part in the current task unnecessary. Conversely, a step or task may have been performed that will make additional steps necessary to perform the current task. For example, if a previous task involved gluing a component, the current task may require waiting a period of time for that glue to set. Performance measures from previously completed tasks may also be used to alter or modify the definition of the steps to be performed on the current task. For example, if a previous task included the step of tightening a nut on a bolt to a particular torque, the measured torque applied to the bolt (performance measure of that previous step) could be used to estimate the torque require to remove that nut for a subsequent task.

In other embodiments, the task may be determined using stored information relevant to the job being performed, such as a work order or other information. The task (and steps) may also be determined based on constraints imposed by the state of the physical structure 106 or the environment. For example, a previous task may have disassembled at least a portion of the physical structure 106, in which case, the steps needed to disassemble the portion of the physical structure are not required. Conversely, a previous task may have modified the physical structure 106 in such a way that additional steps need to be performed. As another example, a step may be required to be performed at a given ambient temperature. If the ambient temperature is too low, the task may include the step of increasing the ambient temperature to a higher value, a step that would not be required if the ambient temperature were sufficient. As another example, a voltage measured on a potentiometer of the physical structure may depend on the ambient temperature. The environment sensors 112A may be used to sense this temperature, and determine the proper setting of the potentiometer based on such ambient temperature. Other environmental constraints may include, for example, the location of other elements of the station 102, such as the arm of the robot 108R, tools 110 or other physical structures, because the location of these structures may prevent disassembly of the physical structure 106. In this case, the environmental sensors may include visible light sensors that sense the location of the physical structure 106 and nearby elements. Also, the environment may include which tools 110 are available at the station 102, and which ones must be retrieved from other locations for the task to be completed. In this case, the environmental sensors 112A may include RFID tags on the tools.

Returning to FIG. 3A, the guidance processing unit then transmits instruction data illustrating the step(s), as shown in block 308. As shown in block 310, the instruction data is received by one or more presentation devices 114 (which may include display 114A and/or the presentation elements of an augmented reality headset 114B, or a speaker or other audio sensor (not illustrated)). In the case of visual presentation devices, a visual representation of the step is presented. In one example, the visual representation of the step is presented on the display 114A. In another example, the visual representation of the step is presented in augmented reality via the presentation elements of the augmented reality headset 114B.

In one embodiment, the instruction data illustrating the step(s) comprises a visual representation of the step for presentation in augmented reality via the augmented reality headset. Augmented reality headsets typically comprise a stereoscopic head-mounted display (providing separate images for each eye), two loudspeakers for stereo sound, and head motion tracking sensors (which may include gyroscopes, accelerometers and structured light systems). Some augmented reality headsets also have eye tracking sensors. By use of the head (and optionally, eye) tracking sensors, the augmented reality headset is aware of its location and orientation in inertial space, and provides this information to the guidance processing unit 104. The guidance processing unit 104 uses this information to determine what the user 108 should be viewing, and can super-impose other images on the image presented to the user 108. For example, if the user 108 is looking at the physical structure 106, the guidance processing unit 104 can highlight a particular part that must be physically manipulated to perform the instruction on the displays provided in the augmented reality headset 114B The user 108 can therefore be made aware of specifically which actions must be completed for each part of the physical assembly, and is particularly useful, as the guidance processing unit 104 does the work of matching the illustrated step with background images seen by the user 108. It also eliminates errors, as the user 108 is less likely to mistake a portion of the physical structure 106 for another (e.g. the user will not loosen the incorrect bolt). The instruction data also typically comprises audio information (e.g. a verbal description of the steps to be performed or aural representation of what the physical structure should sound like during or after performing the step), and presentation elements of the augmented reality headset 114B typically presents this information using the loudspeakers in the augmented reality headset 114B. In one embodiment, the verbal instructions are provided in natural language (e.g. ordinary human conversational speech). Such natural language instructions may be in any language (e.g. English, German, Chinese, etc.). Video and/or audio instructions may be provided on a variety of devices, including mobile computing devices such as cellphones or tablet computers, as well as desktop computing devices.

The user 108 receives the presented instruction data illustrating the step, and commences performing the step, as shown in block 312. This is typically accomplished by a person 108P, but may also be accomplished by the robot 108R, or with the person 108P working in conjunction with the robot 108R, with the person 108P and the robot 108R each performing their subset of the steps, or with the person 108P and the robot 108R working together on one or more of the steps.

While the step is being performed, sensor data that senses performance of the step is generated, as shown in block 314. The sensor data is transmitted, as shown in block 316 and received by the guidance processing unit 104, as shown in block 318. The sensor data is used to monitor the performance of the step, for example to determine progress of the step and when and if the step has been completed. The sensor data may also be used to determine when the user 108 has begun actually performing the step (useful later in computing the time it took the user 108 to complete the step). The sensor data may also be used to store data indicating the performance of the step over time. Such data may be useful in diagnosing failures at a later time.

This sensor data may be generated by any one or combination of sensors 112 at the station 102. Such sensors 112 can observe:

One or more states of the physical structure 106 upon which the task is being performed: This can be accomplished using physical structure sensors 112B integral or attached to the physical structure itself or environmental sensors 112A. The physical structure sensors 112B and environmental sensors 112A may include visual and/or non-visual sensors. For example, in one embodiment, the environmental sensors 112A include visual sensors that visually observe the state of the physical structure 106, using object and pattern recognition techniques similar to those used in self-driving automobiles. Such sensors 112B may include embedded sensors and RFID tags.

One or more states of the performance entity or user 108 performing the task: Sensor(s) 112E for measuring such states may include head-worn devices including audio sensors, imaging and video sensors, inertial measurement sensors such as gyros and accelerometers, and personal sensors such as heart rate monitors;

One or more states of devices (e.g. the tools 110, test equipment and parts) used to perform the task: This can be accomplished using sensors 112DA-112DN mounted on or integrated with the tools 110, or the environmental sensors 112A, in the same way as the environmental sensors may observe the physical structure. Such tools can include RFID tags, or embedded tool sensors;

One or more states of devices that are collaborating on the task: This may include, for example, the state(s) of the robot 108R, as measured by robot sensor(s) 112F; or One or more states of the surrounding environment in which the task is being performed: This may include, for example, environmental sensors 112A sensing the temperature of the station 102 or any element thereof, the humidity of the station, power consumption of the station, or the location of the station 102 elements as a function of time. Such environmental sensors may include imaging sensors, audio sensors, temperature sensors, and humidity sensors.

In one example, the step is for the user 108 to tighten a nut on a bolt using a tool 110A that is a torque wrench. The torque wrench includes a torque sensor 112DA that senses the amount of torque being exerted by the tool 110A. In this embodiment, the torque sensor 112DA measures the torque being applied to the physical structure 106, and transmits sensor data including the measured torque to the guidance processing unit 104. Such transmission may be accomplished either using wires or by wireless means. In another example, the step is for the user to turn a screw until a micro switch is activated (e.g. switched from the off position to an on position). In this case, the sensor transmits a voltage associated with the off position while the screw is turned, and when the screw is turned to the proper position, the switch is activated, and a voltage associated with the on position is transmitted. In this case, real-time sensor data consisting of either one voltage or another voltage is transmitted.

Returning to FIG. 3A, the guidance processing unit 104 computes a performance measure from the sensor data, as shown in block 320. This can be accomplished, for example, by comparing the received sensor data with a threshold value and computing a performance measure from the comparison of the received sensor data and threshold value. The performance measure can be used to monitor performance of the step and/or to verify performance of the step, as described further below. In the example of the torque wrench being used to tighten a nut on a bolt to a particular torque, the received real-time sensor data is compared to a threshold torque value (for example 10 newton meters), and a performance measure is computed from difference between the sensed torque and the threshold torque value.

In an embodiment, the guidance processing unit 104 optionally provides real time feedback about the progress of the task to the user 108. This is illustrated in the dashed blocks of FIG. 3B. Block 322 optionally generates and transmits feedback data according to the comparison of the sensor data and threshold value. This feedback data is optionally received by the presentation devices 114 and presented to the user 108, as shown in blocks 324 and 326. The generation of performance data and transmission of feedback allows the user to receive information regarding the progress of the step while performing the step itself. For example, in the case of the user 108 tightening a nut on a bolt, blocks 322-326 can compute a performance measure comprising a difference between the measured torque and a torque requirement or threshold, and present this difference to the user in terms of a gauge, digital display or other means. The feedback may also be aural (e.g. beeping when the proper torque value has been achieved) or both aural and visual (e.g. showing a visual depiction a comparison between the measured torque and the required torque in a bullseye graph and aural feedback with the tone either occurring when the proper torque has been achieved) or changing pitch, allowing the user to adjust the torque without looking at visual presentations.

The feedback may also provide an environmental state comparison with threshold values in support of physical or safety considerations. For example, such data and related threshold comparisons may include temperature, humidity, the location and/or movement of hazardous devices (e.g. a fork lift is approaching the user and/or is within a distance or threshold of the where an appendage of the user 108 may be during the performance of one or more of the steps of the task), and enable or lock out safety devices. Similarly, the sensor data collected may be provided to other elements at other stations 102 or between stations 102 in the MAT 100 to control those other elements to prevent such hazards (e.g. transmitting the sensor data to the fork lift to warn the operator that a step is going to be performed and that the fork lift should remain a safe distance away.

In block 328, the guidance processing unit 104 determines whether the step has been completed. This can be accomplished by determining if the performance measure computed from the threshold value and the sensor data is within specified tolerances. In one embodiment, this is accomplished by comparing the state of the physical structure 106, elements of the station 102 or MAT 100 against an expected state of the physical structure 106, station 102 elements such as tools 110 or MAT 100 elements if the step was properly completed against the measured or actual state. Turning again to the example of the user 108 tightening a nut on a bolt, block 328 would indicate that the step of tightening the bolt is completed when the performance measure (the difference between the measured torque and the specified required torque, which represents the required value) is within a tolerance (e.g. 0.1 Nm) of the required torque.

If the step is not complete, processing is routed back to block 318 to receive and process further sensor data. The illustrated embodiment also includes an optional step failure test 330 which determines if the performance of the step has failed (e.g. a problem has arisen that prevents performance of the step). If the performance of the step has failed, processing is passed to block 306 to determine another step, with the context that the previously specified step has failed. If the performance of the step has not failed, processing is routed to block 318 to receive and process additional sensor data as before. The failure of a step can be determined using a comparison between a timer begun when the instructions for the step are sent (e.g. block 308) and the time expected to complete the step. Alternatively, the timer could be started by using sensor data to indicate when the actual step was begun on the physical structure 106. Failure of a step may also be determined according to the failure of a tool 110 required to perform the step, or the failure of the environment of the station 102 to attain a state required for performance of the step. For example, if the step requires an ambient temperature of 23 degrees Celsius, and the air conditioning or heating in the facility housing the station 102 is incapable of reaching that value.

If block 328 determines that the step is complete, processing is passed to block 332, which generates and transmits feedback data regarding the performance of the completed step. That feedback data is received and presented to the user 108 by the presentation devices 114 or other means, as shown in blocks 334-336. This feedback data can be used to send a confirmation to the user 108 that the step has been successfully (or unsuccessfully) completed, and is presented after performance of the step.

Figure 3C:
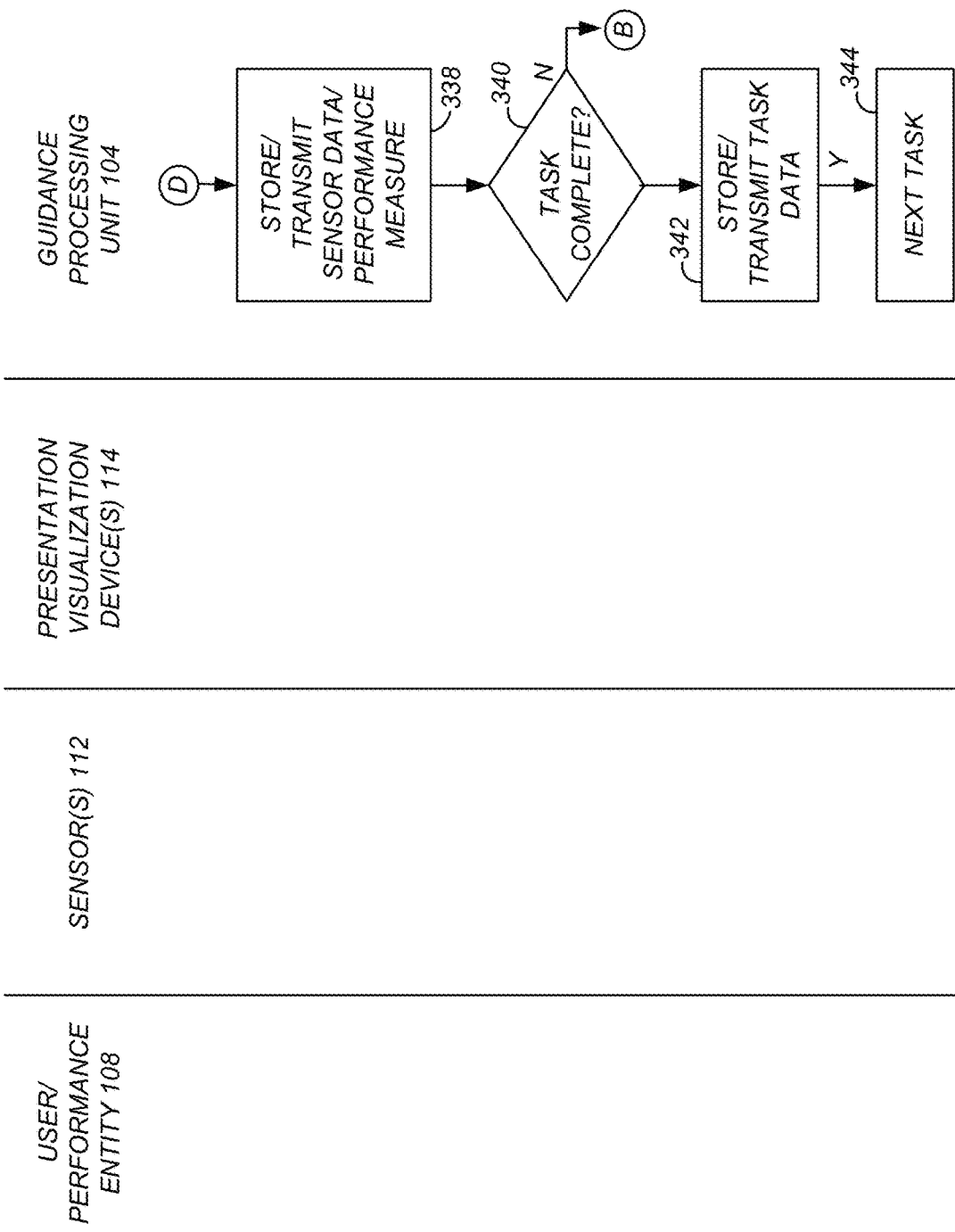

Finally, referring to FIG. 3C, block 338 stores the information gathered or computed with respect to the performance of the step. This information can include the sensor data from some or all of the sensors 112 and performance measures. Other information may also be stored, including the time that was required for the user 108 to perform the required step or task.

Such data can be used to determine how effective and economical the determined steps are in performing the required task, and can be compared to other possible steps in performing the task. For example, initially, a first set of stations 102 may be provided with a particular step sequence to accomplish a task, while another set of stations 102 may be provided with a different test sequence. The time required to perform the test can be determined for each set of stations, and compared to a quality measure in terms of how well the steps were performed, using the sensor data. In this way, two possible step sequences can be compared with real world results, with the most effective of the two possible step sequences selected for future activity.

The sensor data and performance measures may be used to improve on the process of determining the step illustrated in block 306. For example, experienced users 108 may know that it isn't just performing the step, but how the step is performed that allows them to do the job more accurately and in less time. Using sensor data, such techniques and additional steps undertaken by the user 108, even if not in the original definition of the required step, can be identified and integrated into how the step(s) are to be performed in the future. In early production, for example, a general outline of steps may be provided to experienced users, and the additional steps or skipped steps of those users can be used to optimize the process of determining the steps required to perform the task.

This can be accomplished by use of machine learning techniques. For example, the MAT 100 provides instructions to the user 108 for performing a particular procedure via a series of steps, and the user 108 performs the indicated steps. The MAT 100 can then use the sensor data of the user 108 performing the steps as well as other performance measures to "learn" (e.g. via machine learning) which instructions (or kind of instructions) confused the user, and to revise the instructions as required to make the instructions more understandable.

This can be determined, for example from the elapsed time between when the step was presented to the user 108, and the user began performing the step and/or the elapsed time it took the user 108 to complete performance of the step (with excessive time indicative of confusion on the part of the user 108). The MAT 100 may further use machine learning techniques to modify the steps for additional clarity or other improvements. Sensor data can be used to determine the source of the user confusion. For example, sensor data regarding the tools selected for the particular step can confirm or refute the notion that the user 108 used the proper tools in attempting to perform the step. The user 108 may also provide direct input (statements that they are confused or questions posed by the user 108 to clarify instructions that they do not find clear).

Procedures/steps may be modified for all users 108 based on the aggregate of those user's previous performance in performing steps, or may be modified on a user-by-user basis, so that the steps generated and presented to each user 108 by the MAT 100 are customized for each particular user 108 based upon that user's previous performance in previously performed steps or procedures. For example, the MAT 100 may generate a set of baseline steps that are to be performed to complete a particular task. More experienced users or those who have completed those tasks rapidly may be presented abbreviated versions of the instructions, while less experienced users or those who have taken longer to complete those task may be presented with versions of the instructions suggesting how the step might be better or more rapidly completed. Such versions may be based, for example, on sensor data complied from other users 108 who more rapidly completed the assigned steps or tasks. This allows the experience of all users 108 performing the task to be rapidly shared with more inexperienced users. Further, machine learning techniques and sensor data may be used to estimate the experience and expertise of the user, and the MAT 100 may present instructions commensurate with that experience. For example, different instruction sets of steps may be generated for performing the same tasks, and the MAT 100 may decide which instruction set to provide to the user 108 depending on an the user's professed or estimated experience level.

Machine learning techniques can also be used to diagnose and troubleshoot problems using sensor data collected in the performance of the steps. Sensor data from the production or maintenance of the physical structure 106 may be examined to attempt to correlate these failures with how one or more of the steps performed in assembling or maintaining the product using data mining or machine learning techniques. For example, a set of products may be found to have a particular failure (e.g. failure of a bolt). Data mining techniques can be used to analyze the sensor data collected in the production or maintenance of the physical structure 106 and attempt to correlate patterns with those physical structures that have failed. In one example, this analysis could conclude that each of the failed bolts were torqued higher than bolts that did not fail, raising the possibility that the torque specification is incorrect and should be changed. In a more complex example, the analysis may reveal that it was not the torque applied to the bolt, but rather, a tightening pattern or a flaw in a related part.

Finally, block 340 determines if the task is complete (e.g. additional steps are needed to complete the task). In one embodiment, this is accomplished by comparing the state of the physical structure 106, elements of the station 102 or MAT 100 against an expected state of the physical structure 106, station 102 elements such as tools 110 or MAT 100 elements if the task was properly completed against the measured or actual state. If additional steps are required, processing is routed to block 306, which determines the next step, and processing continues as described above. If additional steps are not required, block 344 directs processing to the next task (if any). In one embodiment, this is accomplished by comparing the state of the elements of the station 102 or MAT 100 against an expected state of the station 102 or MAT 100 if the steps and tasks were properly completed.

Data regarding the performance of the task (e.g. the elapsed time or time duration to perform the entire task, or other task performance measures) may optionally be generated and stored, as shown in block 342.

Task or step performance data, along with the sensor data used to generate the task or step performance data may be generated in real time and transmitted to other elements of the MAT 100 for purposes of real time digital documentation of the performance of steps, and used for archival and/or optimization purposes, parts usage for supply chain updates, audit logs and maintenance records.

Figure 4:
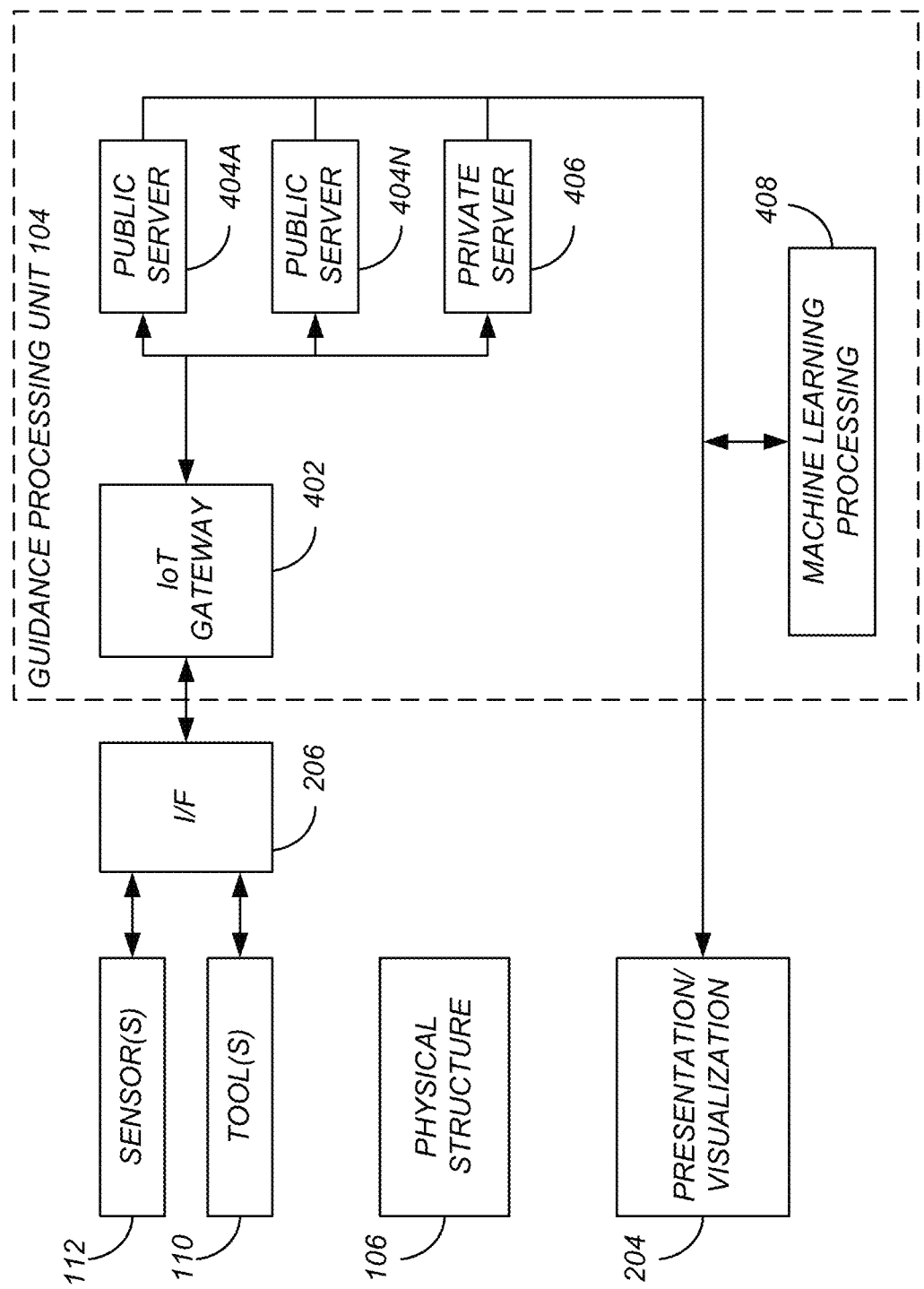
FIG. 4 is a diagram illustrating operation of the guidance processing unit with other elements of the stations and central processor.

FIG. 4 is a diagram illustrating operation of the guidance processing unit 104 with other elements of the stations 102 and central processor 120. In this embodiment, the guidance processing unit 104 is implemented using an Internet of Things (IoT) gateway 402 communicatively coupled to the interface 206 to receive data from and transmit data to sensors 112 and effectors (e.g. tools 110).

Using the sensor interface 206, the gateway 402 collects data from the sensors 112 and tools 110 and provides this information for processing and/or storage in one or more public servers 404A-404N (hereinafter public server(s) 404) and/or one or more private servers 406 at the MAT 100. The public servers 404 are cloud-based processing and storage devices located "in the cloud" (e.g. remote from the station 102 or the MAT 100 and typically managed by another entity). The private server 406 is a data processing and storage device that is typically disposed with the station 102 and/or MAT 100 and is managed by the same entity.

The gateway 402 also receives commands and data from the public server(s) 404 and private server 406 and provides those commands to the interface 206 and thence to the sensor(s) 112 and tool(s) 110 as required. The public servers 404 and private server 406 also provide the instruction data illustrating the step(s) to presentation devices 204 such as display 114A or an audio reproduction device. Machine learning/processing module 408 accesses the instruction data and may modify the instruction data based on previous instruction data, as well as sensor 112 and tool 110 data.

Figure 5A:
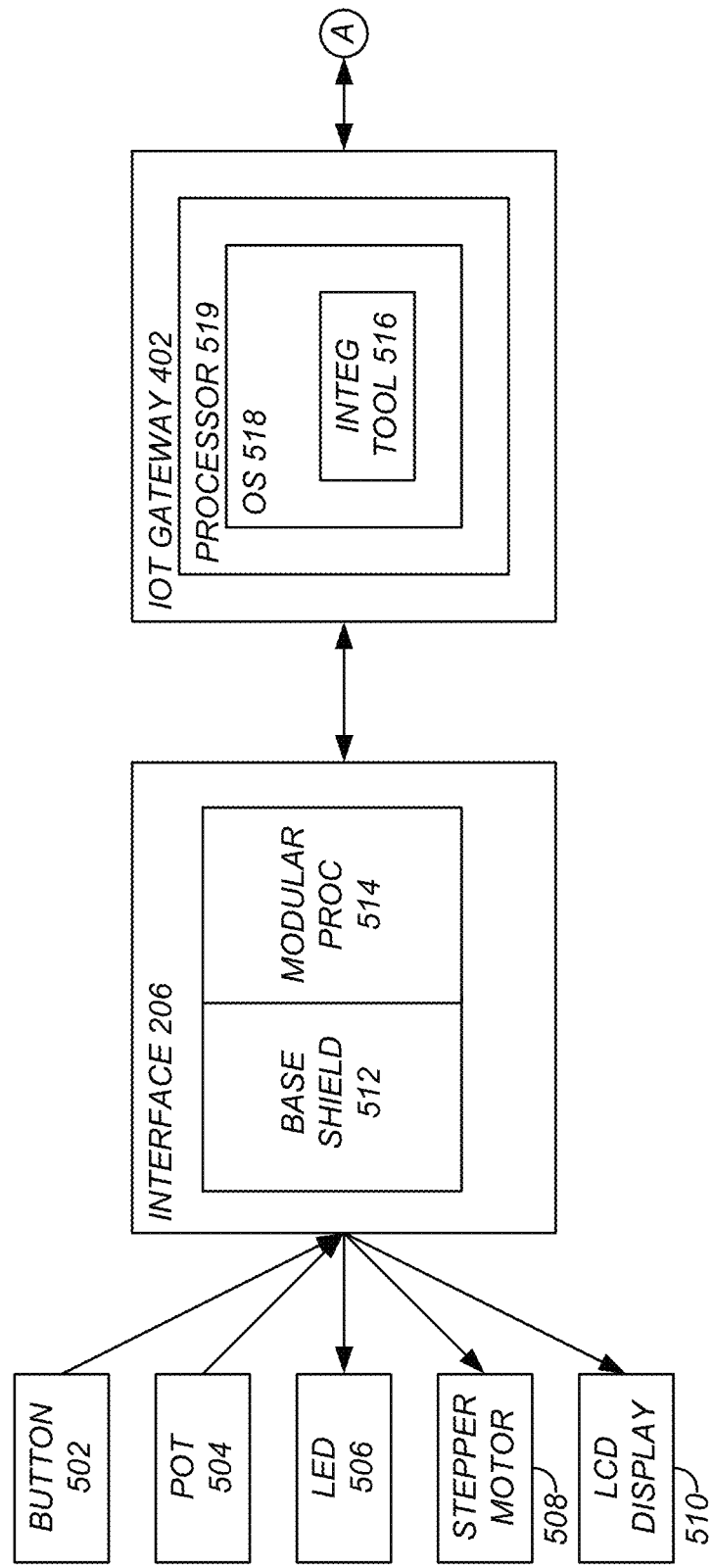
FIGS. 5A and 5B are diagrams illustrating an exemplary test bed implementation of the guidance processor and related elements of the station.
Figure 5B:
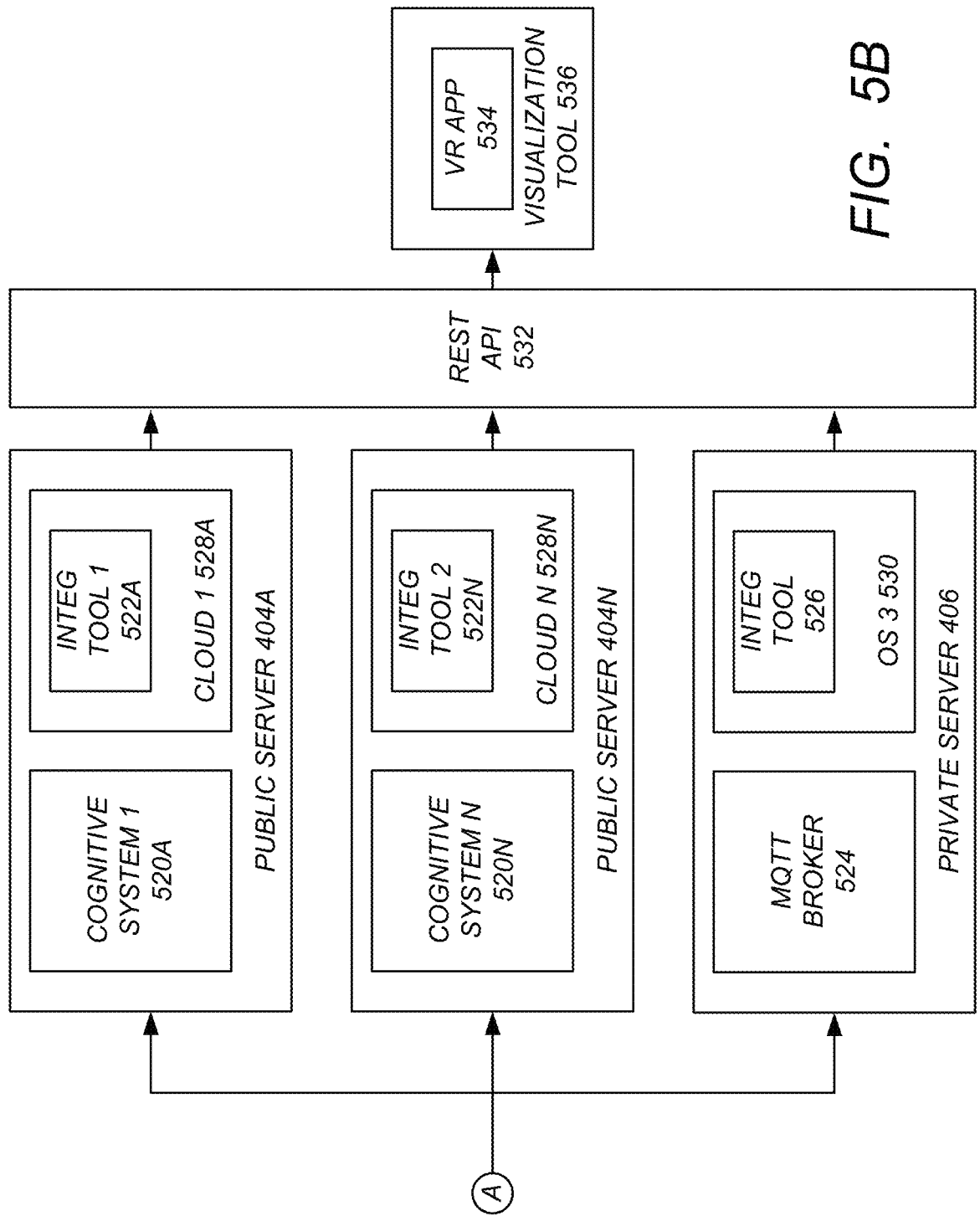

FIGS. 5A and 5B are diagrams illustrating an exemplary test bed implementation of the guidance processing unit 104 and related elements of the station 102. In this embodiment, the sensors 112 include a push button 502 (for example a GROVE button, which responds to a momentary push by outputting a digital voltage signal having a logical high signal and outputs a logical low signal when released) and a potentiometer 504 (providing an analog voltage signal). The effectors or tools 110 include for example, a light emitting diode 506 that receives a digital command, a stepper motor 508 receiving a digital command and/or a liquid crystal display 510 receiving an inter-integrated circuit (I2C) command. The interface 206 may be implemented by a modular processor device 514 (for example, an ARDUINO processor) communicatively coupled to an input/output (I/O) board such as a GROVE base shield 512.

Further, in this embodiment, the IoT gateway 402 is implemented by a gateway processor 519 operating with an operating system (OS) 518 such as RASPBIAN executing an IoT programming tool 516 such as NODE-RED. The IoT gateway 402 implements open source real time messaging (MQTT) over WiFi and can send information from and to any combination of other IoT gateways 402.

The IoT gateway 402 communicates with one of more public servers 404A-404N (collectively referred to hereinafter as public server(s) 404 and/or one or more private server(s) 406. Each public server 404A-404N include a respective cognitive system 520A-520N, respectively as well as a respective cloud platform 528A-528N each implementing a software integration tool providing intercommunication of hardware devices. Each cognitive system 520 combines artificial intelligence (AI) and analytical software to produce a system that can answer questions.

In one embodiment, each public server 404 may be implemented using different software constructs by different vendors. For example, cognitive system 520A may comprise IBM's WATSON IoT platform operating with a BLUEMIX cloud platform 528A running a NODE-RED software integration tool 522A, while cognitive system 520N may comprise an MICROSOFT's AZURE IoT hub, operating with an AZURE application service 528N running a JAVA application integration tool 522N.

The servers 404 and 406 securely communicate with a visualization tool 536 executing an augmented reality (AR) application 534 via a representational state transfer (REST) compliant application program interface (API) 532, and provides API security to ensure only authorized entities can access the system. Compliance with REST architectural constraints place limits on interaction between the elements, standardizing the syntax and means by which the elements communicate with one another. The result is that the architectural elements are essentially "pluggable," allowing one version of an architectural element to be substituted from another version without any significant change in the operation or change in the other architectural elements. In one embodiment, the visualization tool is implemented by an AR authoring tool such as HOLOLENS, available from the MICROSOFT CORPORATION. Using this visualization tool 536, IoT data can be viewed on mobile devices, by using REST based APIs to provide web-based access to the public server(s) 404 and/or private server(s) 406. In one embodiment, private server 406 may be implemented using Message Queue Telemetry Transport (MQTT) Broker 524 and operating system 530 running a NODE-RED software integration tool 526.

Hardware Environment

Figure 6:
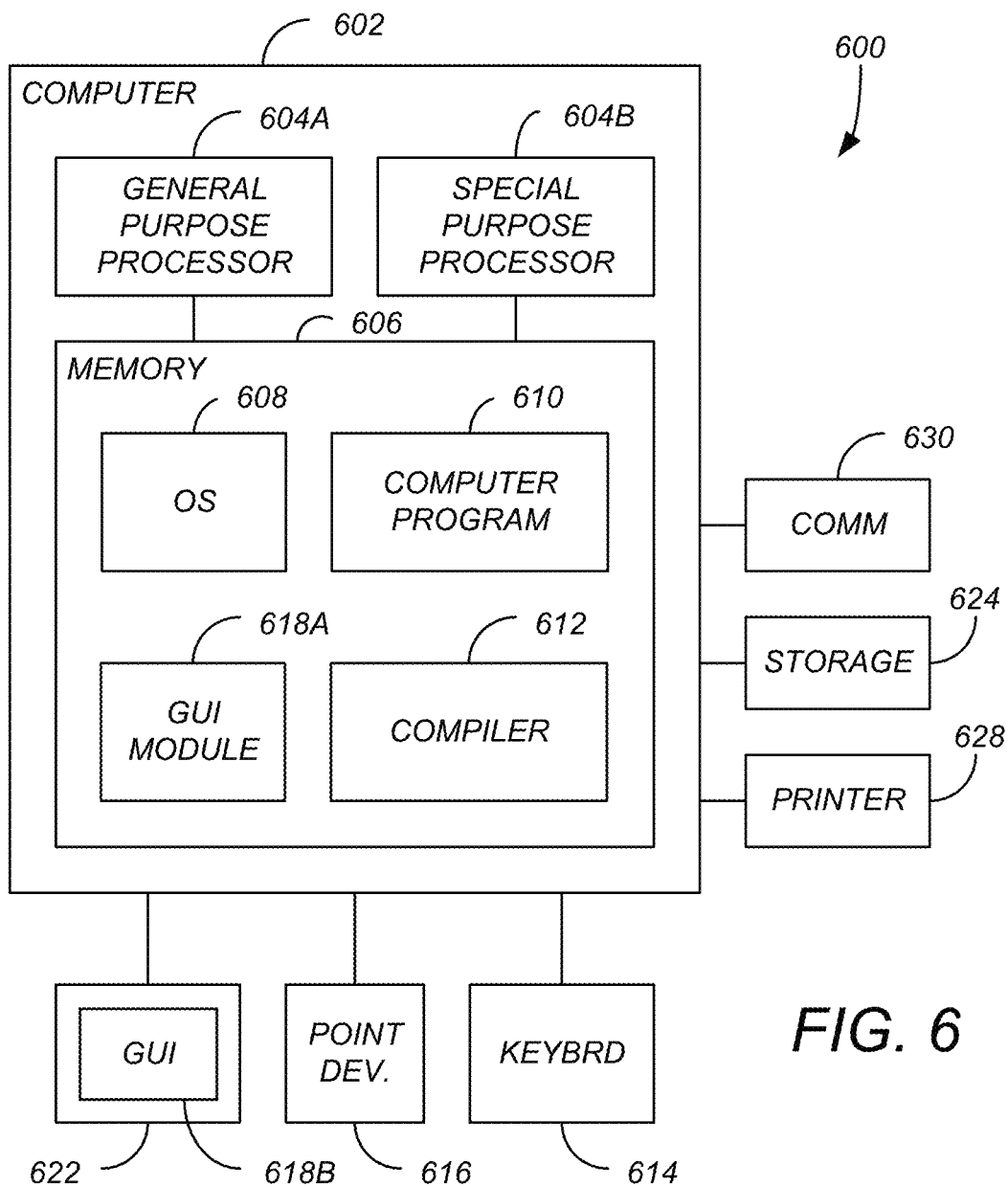
FIG. 6 is a diagram illustrating an exemplary computer system that could be used to implement processing elements of the geolocation system.

FIG. 6 illustrates an exemplary computer system 600 that could be used to implement processing elements of the above disclosure, including the guidance processing unit 104 central processor 120, presentation devices 114, and/or sensors 112. A computer 602 comprises one or more processors 604A and 604B and a memory, such as random access memory (RAM) 606. The processor(s) may include a general purpose processor 604A and/or a special purpose processor 604B. General purpose processors 604A typically do not require any particular computer language or software, and designed to perform general processing operations, but can be programmed for special applications. Special purpose processors 604B may require a particular computer language or software, may implement some functions in hardware, and are typically optimized for a specific application. The computer 602 is operatively coupled to a display 622, which presents images such as windows to the user on a graphical user interface (GUI). The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a GUI module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows a computer application program 610 written in a programming language such as C++, C#, Java, Python or other language to be translated into processor 604 readable code. After completion, the computer program 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 624, which could include one or more fixed or removable data storage devices, such as a hard drive, CD-ROM drive, flash drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing discloses a cognitive assistant that allows a maintainer to speak to an application using Natural Language. The maintainer can quickly interact with an application hands-free without the need to use complex user interfaces or memorized voice commands. The assistant provides instructions to the maintainer using augmented reality audio and visual cues. The assistant will walk the maintainer through maintenance tasks and verify proper execution using IoT sensors. If after completing a step, the IoT sensors are not as expected, the maintainer is notified on how to resolve the situation. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing guidance to a user to perform a task having a plurality of steps performed on a physical structure at a station, comprising:
   (a) receiving, in a guidance processing unit, a command from a performance entity, the command invoking the task;
   (b) determining, in the guidance processing unit, at least one step from the plurality of steps based upon the command and based upon a level of experience of the performance entity, wherein determining the at least one step comprises determining a hierarchical level at which the at least one step is defined based upon a complexity of the at least one step and the level of experience of the performance entity;
   (c) transmitting, from the guidance processing unit to the performance entity, instruction data illustrating how the at least one step is to be performed;
   (d) receiving, in the guidance processing unit, real-time sensor data generated by a sensor proximate the physical structure, the sensor configured for sensing performance of the at least one step; and
   (e) computing a performance measure of the at least one step according to the real-time sensor data, comprising:
      generating real-time feedback data about progress of the at least one step using the real-time sensor data; and
      presenting the real-time feedback data to the user at the station concurrently with performance of the at least one step;
   (f) repeating step (c)-(e) until the at least one step is completed; and
   (g) using a machine learning technique, redefining the plurality of steps to be performed in order to complete the task on a subsequent occasion based upon one or more additional steps that were performed or one or more steps that were skipped by the performance entity when the performance entity completed the task on a prior occasion, as determined based upon the sensor data or the performance measure, including a determination based on an elapsed time from presentation of instruction data to the performance entity to a time at which the performance entity began performance of or completed performance of the at least one step.

2. The method of claim 1, wherein:
the real-time feedback data includes the comparison of the real-time sensor data and a threshold value.

3. The method of claim 1, further comprising:
storing, by the guidance processing unit, the real-time sensor data; and
comparing the real-time sensor data with other real-time sensor data sensing another performance of the at least one step on another physical structure.

4. The method of claim 1, further comprising:
determining the task from the received command; and
determining the at least one step from the determined task.

5. The method of claim 4, wherein:
determining the task from the received command comprises:
   generating a database query from the received command using a natural language interpreter;
   querying a database according to the database query to determine the task; and determining the at least one step from the determined task comprises:
  determining the at least one step from the determined task.

6. The method of claim 5, wherein:
the task is one of a plurality of tasks performed on the physical structure;
the database query is further determined according to current context data including:
  information about other of the plurality of tasks performed on the physical structure; and
  constraints on the task imposed by at least one of a physical structure and an environment of the station.

7. The method of claim 1, wherein the instruction data illustrating performance of the at least one step comprises a visual representation of the at least one step for presentation in augmented reality via an augmented reality headset.

8. The method of claim 1, wherein the real-time sensor data describes a state of the physical structure.

9. The method of claim 8, wherein the sensor is a visible sensor observing performance of the at least one step and the real-time sensor data comprises video data.

10. The method of claim 8, wherein the sensor is disposed on the physical structure upon which the at least one step is performed.

11. The method of claim 1, wherein the real-time sensor data describes a state of a tool used to perform the at least one step.

12. The method of claim 11, wherein the sensor is a visible sensor observing performance of the at least one step and the real-time sensor data comprises video data.

13. The method of claim 11, wherein the sensor is disposed on the tool used to perform the at least one step.

14. The method of claim 1, wherein the real-time sensor data describes a state of devices collaborating on the task.

15. The method of claim 1, wherein the data describes a state of an environment in which the task is performed.

16. The method of claim 1, wherein the command is a hands-free command from a user.

17. The method of claim 1, further comprising determining the level of experience of the performance entity based upon performance data indicating how well the performance entity has performed the at least one step.

18. The method of claim 1, wherein computing the performance measure of the at least one step further comprises:
  comparing the real-time sensor data with a threshold value;
  computing the performance measure according to the comparison; and
  verifying how the at least one step has been performed according to the performance measure, wherein the performance measure is an elapsed time to perform the at least one step, the elapsed time computed from the threshold value and the real-time sensor data.

19. The method of claim 1, wherein redefining the plurality of steps to be performed in order to complete the task comprises redefining the plurality of steps based upon an aggregate performance of a plurality of performance entities when the plurality of performance entities completed the task on prior occasions.

20. The method of claim 1, wherein redefining the plurality of steps to be performed in order to complete the task on a subsequent occasion is determined based also upon a source of user confusion as determined by the sensor data.

21. A system for providing guidance to a user to perform a task having a plurality of steps performed on a physical structure at a station, comprising:
  a guidance processing unit, the guidance processing unit comprising a processor communicatively coupled to a memory storing instructions comprising instructions for:
    receiving a command from a performance entity, the command invoking the task;
    determining at least one step from the plurality of steps based upon the command and based upon a level of experience of the performance entity, wherein determining the at least one step comprises determining a hierarchical level at which the at least one step is defined based upon a complexity of the at least one step and the level of experience of the performance entity;
    transmitting, instruction data illustrating how the at least one step is to be performed to the performance entity;
    receiving real time sensor data generated by a sensor proximate the physical structure, the sensor configured for sensing performance of the at least one step;
    computing a performance measure of the at least one step according to the real-time sensor data, wherein:
  the instructions for computing the performance measure of the at least one step according to the real-time sensor data comprise instructions for:
    repeatedly generating real-time feedback data about progress of the at least one step using the real-time sensor data;
    presenting the real-time feedback data to the user at the station concurrently with performance of the at least one step until the at least one step is completed; and
    using a machine learning technique, redefining the plurality of steps to be performed in order to complete the task on a subsequent occasion based upon one or more additional steps that were performed or one or more steps that were skipped by the performance entity when the performance entity completed the task on a prior occasion, as determined based upon the sensor data or the performance measure, including a determination based on an elapsed time from presentation of instruction data to the performance entity to a time at which the performance entity began performance of or completed performance of the at least one step.

22. The system of claim 21, wherein:
the real-time feedback data includes the comparison of the real-time sensor data and a threshold value.

23. The system of claim 21, wherein the instructions further comprise instructions for:
  storing, by the guidance processing unit, the real-time sensor data; and
  comparing the real-time sensor data with other real-time sensor data sensing another performance of the at least one step on another physical structure.

24. The system of claim 21, wherein the instructions further comprise instructions for:
  determining the task from the received command; and
  determining the at least one step from the determined task.

25. The system of claim 24, wherein:
the instructions for determining the task from the received command comprise instructions for:
  generating a database query from the received command using a natural language interpreter; and querying a database according to the database query to determine the task; and the instructions for determining the at least one step from the determined task comprise instructions for:
    determining the at least one step from the determined task.

26. The system of claim 25, wherein:
the task is one of a plurality of tasks performed on the physical structure; and
the database query is further determined according to current context data including:
    information about other of the plurality of tasks performed on the physical structure; and
    constraints on the task imposed by at least one of a physical structure and an environment of the station.

27. The system of claim 21, wherein the instruction data illustrating performance of the at least one step comprises a visual representation of the at least one step for presentation in augmented reality via an augmented reality headset.

28. The system of claim 21, wherein the real-time sensor data describes a state of the physical structure.

29. The system of claim 28, wherein the sensor is a visible sensor observing performance of the at least one step and the real-time sensor data comprises video data.

30. The system of claim 28, wherein the sensor is disposed on the physical structure upon which the at least one step is performed.

31. The system of claim 21, wherein the real-time sensor data describes a state of a tool used to perform the at least one step.

32. The system of claim 31, wherein the sensor is a visible sensor observing performance of the at least one step and the real-time sensor data comprises video data.

33. The system of claim 31, wherein the sensor is disposed on the tool used to perform the at least one step.

34. The system of claim 21, wherein the instructions further comprise instructions for determining the level of experience of the performance entity based upon performance data indicating how well the performance entity has performed the at least one step.

35. The system of claim 21, wherein the instructions for computing the performance measure of the at least one step further comprise instructions for:
    comparing the real-time sensor data with a threshold value;
    computing the performance measure according to the comparison; and
    verifying how the at least one step has been performed according to the performance measure, wherein the performance measure is an elapsed time to perform the at least one step, the elapsed time computed from the threshold value and the real-time sensor data.

36. The system of claim 21, wherein the instructions further comprise instructions for redefining the plurality of steps to be performed in order to complete the task comprise instructions for redefining the plurality of steps based upon an aggregate performance of a plurality of performance entities when the plurality of performance entities completed the task on prior occasions.

37. The system of claim 21, wherein the instructions of the guidance processing unit for redefining the plurality of steps to be performed in order to complete the task on a subsequent occasion includes instructions for redefining the plurality of steps also upon a source of user confusion as determined by the sensor data.

38. A system for providing guidance to a user to perform a task having a plurality of steps performed on a physical structure at a station, comprising:
    a sensor proximate the physical structure;
    a presentation device; and
    a guidance processing unit, the guidance processing unit comprising a processor communicatively coupled to a memory storing instructions comprising instructions for:
        receiving a command from a performance entity, the command invoking the task;
        determining at least one step from the plurality of steps based upon the command and based upon a level of experience of the performance entity, wherein determining the at least one step comprises determining a hierarchical level at which the at least one step is defined based upon a complexity of the at least one step and the level of experience of the performance entity;
        transmitting, instruction data illustrating how the at least one step is to be performed to the performance entity for presentation by the presentation device;
        receiving real-time sensor data generated by the sensor proximate the physical structure, the sensor configured for sensing performance of the at least one step;
        computing a performance measure of the at least one step according to the real-time sensor data, wherein:
        the instructions for computing the performance measure of the at least one step according to the real-time sensor data comprise instructions for:
        repeatedly generating real-time feedback data about progress of the at least one step using the real-time sensor data and presenting the real-time feedback data to the user at the station concurrently with performance of the at least one step until the at least one step is completed; and
        using a machine learning technique, redefining the plurality of steps to be performed in order to complete the task on a subsequent occasion based upon one or more additional steps that were performed or one or more steps that were skipped by the performance entity when the performance entity completed the task on a prior occasion, as determined based upon the sensor data or the performance measure, including a determination based on an elapsed time from presentation of instruction data to the performance entity to a time at which the performance entity began performance of or completed performance of the at least one step.

39. The system of claim 38, wherein:
the real-time feedback data includes the comparison of the real-time sensor data and a threshold value.

40. The system of claim 38, further comprising:
storing, by the guidance processing unit, the real-time sensor data; and
comparing the real-time sensor data with other real-time sensor data sensing another performance of the at least one step on another physical structure.

41. The system of claim 38, wherein the instructions further comprise instructions for:
determining the task from the received command; and
determining the at least one step from the determined task.

42. The system of claim 41, wherein
the instructions for determining the task from the received command comprises instructions for:
    generating a database query from the received command using a natural language interpreter;

querying a database according to the database query to determine the task; and determining the at least one step from the determined task comprises:

determining the at least one step from the determined task.

43. The system of claim 42, wherein:

the task is one of a plurality of tasks performed on the physical structure;

the database query is further determined according to current context data including:

information about other of the plurality of tasks performed on the physical structure; and constraints on the task imposed by at least one of a physical structure and an environment of the station.

44. The system of claim 38, wherein the instruction data illustrating performance of the at least one step comprises a visual representation of the at least one step for presentation in augmented reality via an augmented reality headset.

45. The system of claim 38, wherein the instructions further comprise instructions for determining the level of experience of the performance entity based upon performance data indicating how well the performance entity has performed the at least one step.

46. The system of claim 38, wherein the instructions for computing the performance measure of the at least one step further comprises:

comparing the real-time sensor data with a threshold value;

computing the performance measure according to the comparison; and verifying how the at least one step has been performed according to the performance measure, wherein the performance measure is an elapsed time to perform the at least one step, the elapsed time computed from the threshold value and the real-time sensor data.

47. The system of claim 46, wherein the instructions for redefining the plurality of steps to be performed in order to complete the task comprise instructions for redefining the plurality of steps based upon an aggregate performance of a plurality of performance entities when the plurality of performance entities completed the task on prior occasions.

48. The system of claim 38, wherein the instructions of the guidance processing unit for redefining the plurality of steps to be performed in order to complete the task on a subsequent occasion includes instructions for redefining the plurality of steps also upon a source of user confusion as determined by the sensor data.

* * * * *

UNITED STATES PATENT AND TRADEMARK OFFICE
CERTIFICATE OF CORRECTION

PATENT NO. : 11,348,475 B2  
APPLICATION NO. : 15/649382  
DATED : May 31, 2022  
INVENTOR(S) : Wood et al.

Page 1 of 1

It is certified that error appears in the above-identified patent and that said Letters Patent is hereby corrected as shown below:

In the Claims

Column 24,
Line 13, "claim 46" should read --claim 38--.

Signed and Sealed this
Eleventh Day of October, 2022

Katherine Kelly Vidal
*Director of the United States Patent and Trademark Office*